(No Model.)
G. H. ZSCHECH.
SAW MILL FEED MECHANISM.
No. 266,003. Patented Oct. 17, 1882.
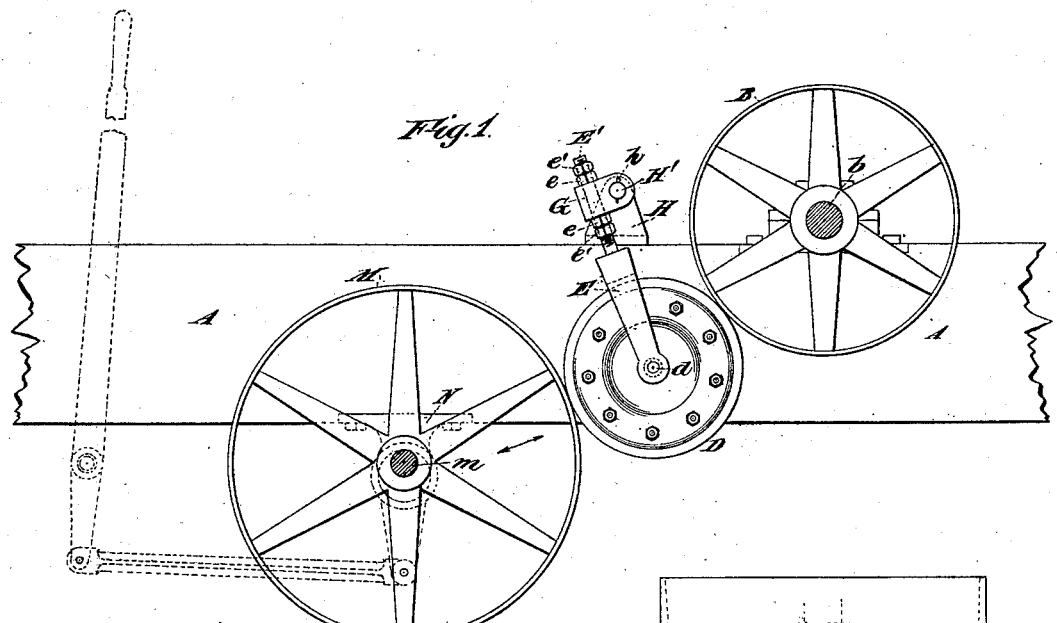
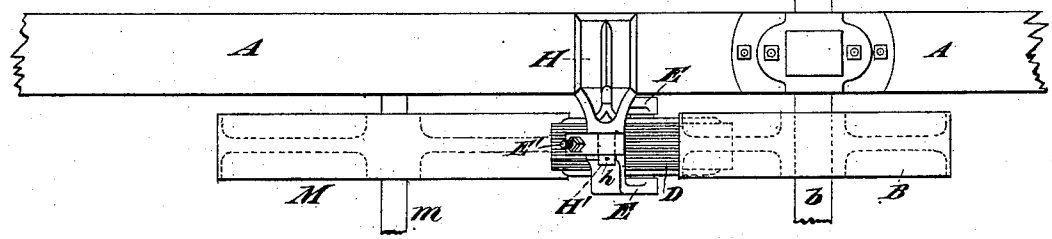
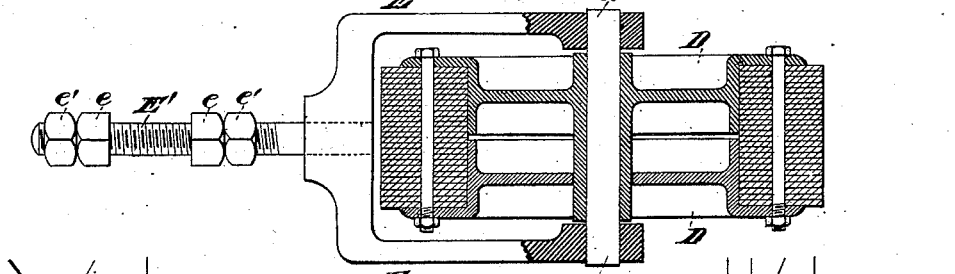

UNITED STATES PATENT OFFICE.

GUSTAVUS H. ZSCHECH, OF INDIANAPOLIS, INDIANA.

SAW-MILL FEED MECHANISM.

SPECIFICATION forming part of Letters Patent No. 266,003, dated October 17, 1882.

Application filed January 6, 1882. (No model.)

*To all whom it may concern:*

Be it known that I, GUSTAVUS H. ZSCHECH, of Indianapolis, Marion county, in the State of Indiana, have invented certain new and useful Improvements in Saw-Mill Mechanisms, of which the following is a specification.

The same relates to the back motion for the carriage on which the log is fed to the saw. I move the carriage backward rapidly, and thus economize time. I provide on the saw-arbor a pulley rotated with the great power and high velocity given to the saw, and communicate motion by friction from that pulley to the carriage. I mount near the saw-arbor a large pulley properly geared to the carriage, with means for giving it a slight motion toward and from the said friction-pulley on the saw-arbor. These pulleys are kept out of contact during the long period while the log is fed slowly forward to the saw, and are forced into connection during the shorter period while the log is being run rapidly back; but inasmuch as the position of the saw-arbor requires to be changed from various causes, eminently the gradual lessening of the diameter of the saw as it is consumed by use, I mount an additional pulley loosely between the two, with capacity for adjustment relatively to the line joining the two pulleys, so that any change of position of the saw-arbor may be compensated for by a corresponding adjustment of the intermediate pulley, and the several pulleys be always ready to engage by friction on slightly moving the bearings of the back-motion pulley. My intermediate pulley swings freely and truly on its point of suspension. It is held by gravity out of contact with the pulley on the saw-arbor, except when it is intentionally forced up to induce the required back motion. My intermediate pulley is also capable of adjustment by nice increments to and from the center line joining the other pulleys. It can also swivel to present its surfaces fairly to the other pulleys. This latter is important, inasmuch as the shafts cannot be always parallel and the pulleys always true. The swiveling allows the intermediate pulley to accommodate itself and assume automatically a proper bearing-surface, bearing against each pulley.

The accompanying drawings form a part of this specification, and represent what I consider the best means of carrying out the invention.

Figure 1 is a side elevation. Fig. 2 is a plan of the portions shown in Fig. 1. Fig. 3 is a central section and elevation of the friction-pulley on a larger scale.

The drawings show the novel parts, with so much of the ordinary parts as is necessary to show their relation thereto.

Similar letters of reference indicate corresponding parts in all the figures.

A is a fixed frame-work; B, a pulley mounted on the saw-arbor $b$, and strongly turned by a broad belt running on a suitable pulley, B', on the end of the arbor.

M is a large friction-pulley mounted on a shaft, $m$, resting in boxes N, which are movable forward and backward in the direction of the double-pointed arrow. It is connected either directly or through intermediate gearing with the ordinary pinion, traversing in a rack, or with other suitable means not represented for traversing the carriage.

D is my intermediate loose pulley. It is formed of layers of tar-paper firmly compressed between disks of iron by the aid of bolts and nuts, as indicated. Its pivot or prolonged axis $d$ is held in a fork, E, which terminates above in a screw-bolt, E', which is held loosely by the aid of nuts $e$ and jam-nuts $e'$, with freedom to turn in a swivel-piece, G, another hole in which is bored at right angles to that which receives the screw E'. The other hole receives a stud, H', extending from a bracket, H, bolted on the framing A. A transverse pin, $h$, holds the piece G and its connections on the stud H'.

The saw and the pulley B run uniformly and at a high velocity. While the carriage is being slowly fed forward for the saw to act my invention is of no effect; but when the log is completely riven, or when for any reason it is desired to run the carriage back either entirely or partly, the proper movement is made, which liberates the forward feed mechanism, (not represented,) and the boxes N, with the shaft $m$ and friction-pulley M, are moved so as to force the intermediate pulley into contact with the pulley B. The force transmitted by friction from the strongly-running pulley B rotates the intermediate roller, D, and through it the pulley M, and the carriage, with its log, is rapidly run back. The swivel-piece G, by being pivoted on the horizontal stud H', allows the intermediate pulley to swing freely. It is held by gravity against the pulley M and out of contact with the pulley B during the period while it is out of use. It turns freely and smoothly on this strong center when required. The nuts and jam-nuts $e$ $e'$ allow the forked piece E E', and consequently the pulley D, to be adjusted up and down, so that the pulley D shall be at a greater or less distance from the stud H', as required. The turning of the upright bolt E' in a smooth cylindrical hole in the swivel-piece G allows it, and consequently the roller D, to swivel to any extent required in order to allow it to rest fairly against the surfaces of the respective pulleys B and M. The nuts and jam-nuts $e$ $e'$ are set so as to maintain their places rigidly on the screw-bolt E', pressing but slightly against the respective faces of the swivel-piece G.

Modifications may be made in the details. The material of the intermediate roller, D, may be varied.

I claim as my invention—

1. In a circular-saw mill having the back feed-shaft, $m$, driven by friction from a pulley on the saw-shaft $b$, with provisions for moving the former toward and from the latter to make and break the connection, an intermediate pulley, D, and means $e$ $e'$ for changing its position to allow for different positions of the saw-shaft $b$, and adapted to transmit the motion by friction, as herein specified.

2. The intermediate pulley, D, and provisions $e$ $e'$ for adjusting up and down to compensate for change in position of the saw-shaft, in combination with the pulley M on the back feed-shaft, $m$, means for moving the latter to make and break the frictional contact, and the provisions E' H' for allowing said intermediate pulley to swing and swivel, all substantially as herein specified.

In testimony whereof I have hereunto set my hand, at Indianapolis, Marion, Indiana, this 23d day of November, 1881, in the presence of two subscribing witnesses.

GUSTAVUS H. ZSCHECH.

Witnesses:
ADOLPH SEIDENSTICKER,
EDWARD MUELLER.